United States Patent Office 3,310,555
Patented Mar. 21, 1967

3,310,555
2-PHENYL AND CYCLOHEXYL-2-CYANO-2-TERTIARY AMINO LOWER ALKYL-ACETAMIDES
Marcel Pesson, Paris, France, assignor to Société Anonyme dite: Laboratoire Roger Bellon, a French company
No Drawing. Filed Sept. 11, 1963, Ser. No. 308,090
Claims priority, application Great Britain, Sept. 17, 1962, 35,375/62
10 Claims. (Cl. 260—246)

This invention relates to cyanacetamide derivatives, compositions containing them, processes for their production, and new intermediates for the production of the said derivatives.

The present invention provides new therapeutically useful derivatives of cyanacetamide, namely compounds of Formula I:

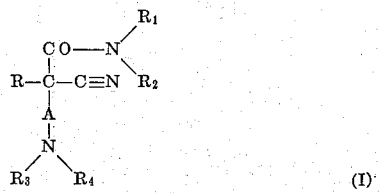

and their acid addition salts in which R represents phenyl, phenyl substituted by at least one halogen atom or alkoxy or amino group, alkyl, aralkyl, or cycloalyl, $R_1$ and $R_2$ are the same or different members and represent alkyl radicals or, together with the nitrogen atom to which they are attached, form a heterocyclic ring, A represents a substituted or unsubstituted, straight or branched chain, saturated, divalent hydrocarbon group providing a bridge of 2 or 3 carbon atoms between the carbon and nitrogen atoms to which it is attached, which group may be attached to $R_3$ or $R_4$ to form a heterocyclic ring containing the nitrogen to which the said group is attached, and $R_3$ and $R_4$ are the same or different members and represent alkyl radicals or, together with the adjacent nitrogen atom, form a heterocyclic ring, or one of $R_3$ and $R_4$ represents an alkyl radical and the other is joined to A as aforesaid. The term "lower alkyl" is used herein to denote alkyl having 1 to 4 carbon atoms.

Especially valuable are those compounds of Formula I in which R represents phenyl, p-chlorophenyl, benzyl, or cyclohexyl, $R_1$ and $R_2$ are the same or different lower alkyl groups or together with the adjacent nitrogen constitute a pyrrolidine, piperidine, or morpholine ring, A represents an unsubstituted alkylene group of 2 to 6 carbon atoms forming a bridge of 2 or 3 carbon atoms between the indicated carbon and nitrogen atoms, and $R_3$ and $R_4$ are the same or different lower alkyl groups or together with the adjacent nitrogen constitute a piperidine or morpholine ring, and their acid addition salts.

The aforesaid new compounds have important industrial application, more especially in a chemotherapy, because of their anti-tussive and spasmolytic properties. The combination of these two properties enables the new compounds to be used without the harmful secondary effects of known anti-tussive agents, such as codeine, which has a constipating action. The invention therefore includes within its scope pharmaceutical compositions containing, in association with a pharmaceutical carrier compatible therewith, at least one of the aforementioned compounds in the form of the base or pharmacologically acceptable acid addition salt.

According to a feature of the invention, the compounds of Formula I are produced by condensing a tertiary cyanacetamide of Formula II:

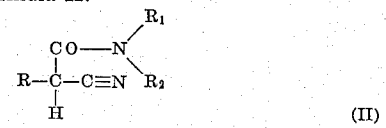

with a tertiary halogeno amine of formula III:

wherein Hal represents a halogen atom and the other symbols are as hereinbefore defined. When the halogen of the halogeno amine of Formula III is in the 2-position with respect to the tertiary amine group, derivatives of 2-cyano-4-dialkylamino butyramides are obtained, whereas when the halogen is in the 3-position, derivatives of 2-cyano-5-dialkylamino valeramides are obtained.

This reaction may advantageously be carried out by adding the cyanacetamide of Formula II to a solution of an alkali metal alkoxide, thus giving in a first stage the corresponding carbanion of the amide, and then reacting this carbanion is a second stage with a halogeno amine of Formula III. The two stages of the above reaction may be carried out in one operation in the same solvent.

As solvent, it is possible to use various anhydrous alcohols, such as ethyl alcohol, isopropyl alcohol and t-butyl alcohol, the last mentioned permitting the best yields to be obtained.

In the preferred method of carrying out the process of the invention, an alkali metal, preferably sodium, is dissolved in an excess of the anhydrous alcohol used as solvent and the cyanacetamide and the halogeno amine are added to the resultant solution in the proportion of 1 mole of each compound to 1 gram atom of alkali metal employed. The mixture is stirred for 2 to 8 hours in a dry atmosphere and, after cooling, the product of the reaction is isolated by adding water, extracting with an organic solvent and extracting the basic fraction with an aqueous acidic solution. The base is then separated by adding a mineral base to the acidic medium and a further extraction with organic solvent is then effected, followed by drying of the organic solution and evaporation of the solvent.

The products obtained using tertiary halogeno amines of Formula III in which the group A is an unsubstituted straight alkylene chain, may be solid, in which case they are purified by recrystallization, or they may be liquid, in which case they are purified by vacuum distillation. On the other hand, when the tertiary halogeno amines have a substituted or branched alkylene chain A group, the products obtained are oils which are purified by distillation and in this case the products may be mixtures of isomers.

The compounds of the foregoing general Formula II are new compounds and as such within the scope of the present invention. According to a further feature of the invention the compounds of general Formula II are prepared by reacting a secondary amine of Formula IV:

with a cyanacetate of Formula V:

wherein $R_5$ represents a lower alkyl radical, e.g. ethyl, and the other symbols are as hereinbefore defined.

This reaction is easily carried out when using secondary amines having boiling points higher than 80° C., e.g.

piperidine, morpholine and pyrrolidine. In such cases the amine is added in slight excess to the cyanacetate with stirring and cooling. When the mixture has returned to normal temperature, the flask is heated in an oil bath, the temperature of which is brought progressively to, and then maintained at, 120–130° C., until the alcohol formed in the reaction distills. The residual alcohol and the amine which has not reacted are removed by vacuum distillation, for instance, by distillation in the vacuum of a water-jet pump, the bath temperature being kept at 120–130° C. After cooling, the reaction mass is taken up in a dilute acid solution. The amide, which is generally solid, is centrifuged, washed, dried and recrystallized.

When the boiling point of the secondary amine is below 80° C., as is the case, for example, with diethylamine, the reaction is carried out in an autoclave at 130–150° C. in the presence of a large excess of amine. The product of the reaction is then made acid by adding a dilute mineral acid, and the amide is isolated, either by filtration or by extraction with an organic solvent.

In cases where the secondary amine is volatile at ordinary temperature, the reaction is carried out by heating in an autoclave to 150° C., using an excess of a solution of the amine in a neutral solvent such as benzene. After cooling, the organic solution is washed with a dilute solution of a mineral acid, then washed with water, dried and the solvent removed, preferably in vacuo. The resultant amide is recrystallized from a suitable solvent.

The following Examples illustrate the preparation of the compounds of the invention. Eight different series of Examples are described; for each series, there is first of all described the preparation of the cyanacetamide corresponding to Formula II and then the preparation from the cyanacetamide of compounds of Formula I corresponding to various designations of the group

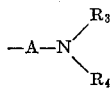

FIRST SERIES OF EXAMPLES

N-pentamethylene phenyl cyanacetamide of the formula:

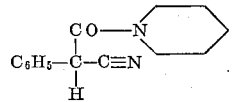

is initially prepared.

47.5 g. of ethyl phenyl cyanacetate (about 0.25 mole) and 21.25 g. of piperidine (about 0.25 mole) are mixed in a 250 cc. flask, while heating. When the mixture has returned to normal temperature, the flask, fitted with a condenser, is immersed in an oil bath, the temperature of which is brought to 130–140° C. and kept at this temperature until the alcohol produced distills, this taking 5 to 6 hours. After cooling, the solid mass is taken up in 200 cc. of 2.5 N HCl, centrifuged, washed with water and dried. 47 g. of a product are obtained, this product being purified by recrystallization from alcohol. The purified product melts at 130° C.

*Analysis.*—$C_{14}H_{16}N_2O$ (M.W. 228.28). Calculated, percent: C=73.65, H=7.06, N=12.27. Found, percent: C=73.74, H=6.98, N=12.27.

The same product can be obtained by the action of N-pentamethylene carbamic acid chloride on benzyl cyanide in toluene in the presence of sodium amide.

Example 1

2 - phenyl-2-cyano-4-diethylamino - N - pentamethylene butyramide:

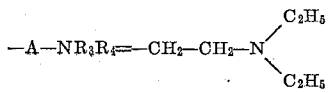

In a 2-necked flask, provided with a mechanical stirrer, a dropping funnel and a reflux condenser equipped with a potash trap, 1.3 g. of sodium are dissolved in 100 cc. of tertiary butyl alcohol with stirring and heating. 11.6 g. of N-pentamethylene phenyl cyanacetamide are then added, followed by 6.8 g. of 2-diethylamino chloro ethane. The mixture is heated under reflux with stirring for 5 hours. After cooling, the mass is taken up in 200 cc. of water. The organic phase is separated, the aqueous phase is treated with ether and the ethereal solutions are recombined with the organic phase, which is extracted with 2.5 N hydrochloric acid (3 x 40 cc.). The acid solution is made alkaline with ammonia and gives an oil which is extracted with diethyl ether. The ethereal solution is dried over magnesium sulfate and filtered. The solvent is distilled off and the residue is fractionated in vacuo. The main fraction is formed by a viscous oil which boils at 184° C./1 mm. 10.3 g. of the base are obtained, which forms an acid oxalate. The latter, recrystallized from a mixture of ethyl acetate and alcohol, melts at 144-146° C.

*Analysis.*—$C_{20}H_{29}N_3O\cdot C_2O_4H_2$ (M.W.=417.41). Calculated, percent: C=63.29, H=7.48, N=10.07. Found, percent: C=62.95, H=7.27, N=10.30.

Example 2

In a similar manner to that described in the preceding Example, 2 - phenyl-2-cyano - 4 - dimethylamino-N-pentamethylene butyramide is prepared from 2-dimethylamino chloro ethane.

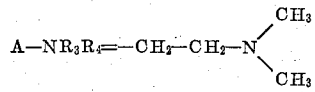

The product is an oil which boils at 172° C./0.9 mm. The hydrochloride melts at 212–215° C.

*Analysis.*—$C_{18}H_{25}N_3O\cdot HCl$ (M.W.=335.90). Calculated, percent: C=64.37, H=7.74, N=12.51. Found, percent: C=64.44, H=7.80, N=12.61.

Example 3

In a similar manner, 2-phenyl-2-cyano-4-piperidino-N-pentamethylene butyramide is prepared from piperidino chloro ethane.

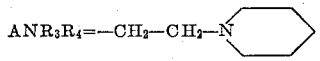

This is an oil which boils at 205–206° C./1.2 mm. The oxalate, recrystallized from ethanol, melts at 159° C.

*Analysis.*—$C_{21}H_{29}N_3O\cdot C_2O_4H_2$ (M.W.=429.50). Calculated, percent: C=64.31, H=7.28, N=9.78. Found, percent: C=64.50, H=7.24, N=9.72.

Example 4

In a similar manner, 2-phenyl-2-cyano-4-(N-morpholino)-N-pentamethylene butyramide is prepared from N-morpholine-2-chloroethane.

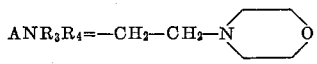

The resulting base is a solid which melts at 90–92° C. when recrystallized from a cyclohexane-petroleum ether mixture.

*Analysis.*—$C_{20}H_{27}N_3O_2$ (M.W.=341.44). Calculated, percent: C=70.35, H=7.97, N=12.31. Found, percent: C=70.18, H=7.72, N=12.22.

The hydrochloride melts at 190° C. with decomposition.

Example 5

In a similar manner, starting from 1-ethyl-3-chloro piperidine, a basic product is obtained which boils at 205° C./1 mm. Its molecular weight, by perchloric acid determination (mol. weight found 337.8), is in conformity with the empirical formula $C_{21}H_{29}N_3O$ (M.W.=339.47).

The analysis is also in good conformity with this empirical formula:

Calculated, percent: C=74.30, H=8.61, N=12.38.
Found, percent: C=74.17, H=8.43, N=12.16.

It has not been possible to obtain a crystallized salt from this base. It is probable that it is constituted by one or both of the isomers:

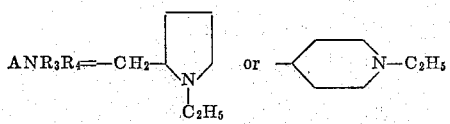

Example 6

In a similar manner, 2-phenyl-2-cyano-5-dimethylamino-N-pentamethylene valeramide is obtained from 3-dimethylamino-1-chloro propane.

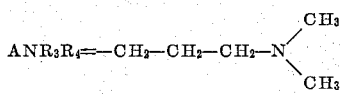

This valeramide is an oil which boils at 175° C./0.5 mm. The hydrochloride melts at 187°–189° C.

*Analysis.*—$C_{19}H_{27}N_3O\cdot HCl$ (M.W.=349.90). Calculated, percent: C=65.16, H=8.00, N=12.00, Cl=10.14.
Found, percent: C=65.50, H=8.40, N=11.81, Cl=10.41.

SECOND SERIES OF EXAMPLES

N-pentamethylene p-chloro phenyl cyanacetamide is first prepared.

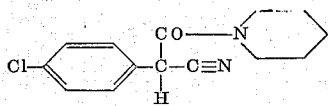

A mixture of 44.6 g. of ethyl p-chloro phenyl cyanacetate and 17 g. of piperidine is heated to 150° C., as described above. When the alcohol produced in the reaction ceases to distill (duration of the operation about 4 hours), the reaction mixture, after cooling, is taken up in 200 cc. of 2.5 N hydrochloric acid and the product is extracted with ethyl acetate. The organic solvent solution is washed in water, dried and the solvent is removed by vacuum distillation. The crystalline residue is purified by recrystallization from cyclohexane. The product thus obtained melts at 105° C.

*Analysis.*—$C_{14}H_{15}ClN_2O$ (M.W.=262.50). Calculated, percent: C=64.00, H=5.71, N=10.66, Cl=13.52.
Found, percent: C=60.30, H=7.16, N=10.67, Cl=17.68.

Example 7

N-pentamethylene p-chloro phenyl cyanacetamide is reacted with 2-diethylamino chloro ethane in accordance with the method described in Example 1 giving 2-p-chloro phenyl-2-cyano-4-diethylamino-N-pentamethylene butyramide. This is an oil which boils at 176–182° C./0.25 mm. The hydrochloride, recrystallized from acetone, melts at 175° C.

*Analysis.*—$C_{20}H_{28}ClN_2O\cdot HCl$ (M.W.=398). Calculated, percent: C=60.30, H=7.28, N=10.55, Cl=17.83.
Found: C=60.30, H=7.16, N=10.67, Cl=17.68.

THIRD SERIES OF EXAMPLES

There is first prepared N-diethyleneoxy phenyl cyanacetamide of the formula:

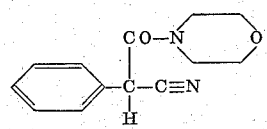

1.9 g. of ethyl phenyl cyanacetate (1/10 mole) and 8.7% morpholine (1/10 mole) are treated at 150° C. as described above for 4 hours. After cooling, the solid mass is triturated with 200 cc. of 2.5 N HCl, centrifuged, washed with water and dried. 20 g. of a product are obtained, which is purified by recrystallization from 35% aqueous ethanol or cyclohexane. The purified product melts at 108–109° C.

*Analysis.*—$C_{13}H_{14}N_2O_2$ (M.W.=230.26). Calculated, percent: C=67.81, H=6.13, N=12.17. Found, percent: C=67.97, H=6.05, N=12.45.

Example 8

The condensation of N-diethyleneoxy phenyl cyanacetamide with 2-diethylamino chloro ethane gives 2-phenyl-2-cyano-4-diethylamino-N-diethyleneoxy butyramine.

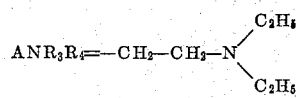

This product is recrystallized from petroleum ether and then melts at 68° C. (yield=60%).

*Analysis.*—$C_{19}H_{27}N_3O_2$ (M.W.=329.43). Calculated, percent: C=69.27, H=8.26, N=12.76. Found, percent: C=69.51, H=8.31, N=12.60.

Example 9

N-diethyleneoxy phenyl cyanacetamide is condensed with 2-dimethylamino chloro ethane as described in Example 2, giving 2-phenyl-2-cyano-4-dimethylamino-N-diethyleneoxy butyramide:

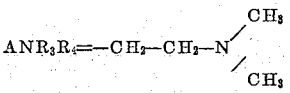

This product boils at 175° C./0.9 mm. and melts at 56° C. The hydrochloride, recrystallized from a mixture of ethyl acetate and ethanol, melts at 208° C.

*Analysis.*—$C_{17}H_{23}N_3O_2\cdot HCl$ (M.W.=337.90). Calculated, percent: C=60.37, H=7.10, N=12.43, Cl=10.8.
Found, percent: C=60.43, H=7.06, N=12.35, Cl=10.8.

Example 10

N-diethyleneoxy phenyl cyanacetamide is condensed with 2-piperidino chloroethane, giving 2-phenyl-2-cyano-4-piperidino-N-diethyleneoxy butyramide.

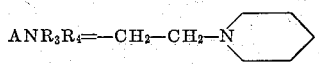

Recrystallized from petroleum ether, this product melts at 125° C. (yield=80%).

*Analysis.*—$C_{20}H_{27}N_3O_2$ (M.W.=341.44). Calculated, percent: C=70.35, H=7.97, N=12.31. Found, percent: C=70.40, H=7.94, N=12.38.

The hydrochloride melts at 200° C.

Example 11

N-diethyleneoxy phenyl cyanacetamide is condensed with 2-N-morpholino chloro ethane, giving, in a yield of 67%, 2-phenyl-2-cyano-4-N-morpholino-N-diethyleneoxy butyramide.

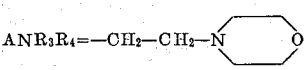

Recrystallized from a mixture of ethyl acetate and petroleum ether, this product melts at 128° C.

*Analysis.*—$C_{19}H_{25}N_3O_3$ (M.W.=343.40). Calculated, percent: C=66.45, H=7.34, N=12.24. Found, percent: C=66.41, H=7.17, N=12.23.

The hydrochloride, recrystallized from alcohol, melts at 210° C.

Example 12

N-diethyleneoxy phenyl cyanacetamide is condensed with 3-dimethylamino-1-chloro propane, giving, in a yield of 75%, 2-phenyl-2-cyano-5-dimethylamino-N-diethyleneoxy valeramide.

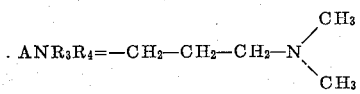

This is a solid substance melting at 71° C. when recrystallized from petroleum ether.

*Analysis.*—$C_{18}H_{25}N_3O_2$ (M.W.=315.40). Calculated, percent: C=68.54, H=7.99, N=13.32. Found, percent: C=68.79, H=8.04, N=13.35.

The hydrochloride melts at 200–202° C.

Example 13

N-diethyleneoxy phenyl cyanacetamide is condensed with 1-chloro-2-dimethylamino propane and yields, after purification as described above, a basic product which boils at 183° C./1.75 mm. (yield=70%). The analysis corresponds to the empirical formula $C_{18}H_{25}N_3O$ (M.W.=315.40).

Calculated, percent: C=68.54, H=7.99, N=13.32. Found, percent: C=68.32, H=7.86, N=13.50.

This substance does not give crystalline salts and it may be composed of one or both of the two isomers:

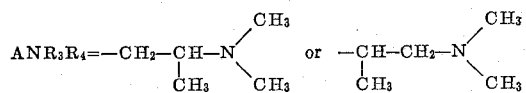

FOURTH SERIES OF EXAMPLES

There is first prepared N-tetramethylene phenyl cyanacetamide, which corresponds to the formula:

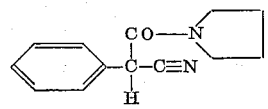

A mixture of 38 g. of ethyl phenyl cyanacetate (1/5 mole) and 14 g. of pyrrolidine (1/5 mole) is heated for 5 hours to 150° C. as described above. Then the alcohol formed and unreacted pyrrolidine are removed by distillation under the vacuum of a water-jet pump. After cooling, the distillation residue is triturated with 100 cc. of 2.5 N hydrochloric acid, the insoluble substance is centrifuged, washed with water, dried and recrystallized from a mixture of ethyl acetate and petroleum ether. The product obtained melts at 97° C.

*Analysis.*—$C_{13}H_{14}N_2O$ (M.W.=214.26). Calculated, percent: C=72.87, H=6.59, N=13.08. Found, percent: C=73.05, H=6.38, N=13.20.

Example 14

N-tetramethylene phenyl cyanacetamide is condensed with 2-diethylamino chloro ethane, giving 2-phenyl-2-cyano-4-diethylamino-N-tetramethylene butyramide:

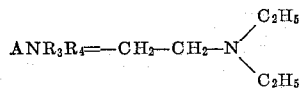

This product boils at 168–172° C./0.7 mm. The acid oxalate melts at 110–115° C.

*Analysis.*—$C_{19}H_{27}N_3O.C_2O_4H_2$ (M.W.=403.50). Calculated, percent: C=62.51, H=7.25, N=10.42. Found, percent: C=62.43, H=7.22, N=10.38.

Example 15

2-dimethylamino chloro ethane is condensed with N-tetramethylene phenyl cyanacetamide giving 2-phenyl-2-cyano-4-dimethylamino-N-tetramethylene butyramide.

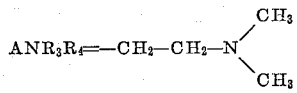

This product boils at 165° C./0.5 mm. (yield=70%). The hydrochloroide, recrystallized from a mixture of methyl ethyl ketone and ethanol, melts at 220° C. with decomposition.

*Analysis.*—$C_{17}H_{23}N_3O.HCl$ (M.W.=321.9). Calculated, percent: C=63.37, H=7.45, N=13.04. Found, percent: C=63.15, H=7.51, N=13.01.

Example 16

N-tetramethylene phenyl cyanacetamide is condensed with 2-piperidino chloro ethane, giving, in a yield of 75%, 2-phenyl-2-cyano-4-piperidino-N-tetramethylene butyramide.

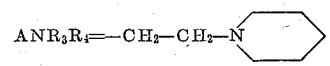

Recrystallized from petroleum ether, this product melts at 100° C.

*Analysis.*—$C_{20}H_{27}N_3O$ (M.W.=325.44). Calculated, percent: C=73.81, H=8.36, N=12.91. Found, percent: C=74.08, H=8.35, N=13.00.

The hydrochloride melts at 137° C.

Example 17

N-tetramethylene phenyl cyanacetamide is condensed with 2-N-morpholino chloro ethane, giving, in a yield of 62%, 2-phenyl-2-cyano-4-N-morpholino-N-tetramethylene butyramide.

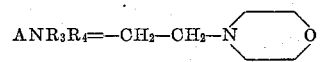

Recrystallized from petroleum ether, this product melts at 95° C.

*Analysis.*—$C_{19}H_{25}N_3O_2$ (M.W.=327.41). Calculated, percent: C=69.70, H=7.70, N=12.84. Found, percent: C=69.74, H=8.02, N=12.70.

Example 18

N-tetramethylene phenyl cyanacetamide is condensed with 1-dimethylamino-3-chloro propane, giving, in a yield of 77%, 2-phenyl-2-cyano-5-dimethylamino-N-tetramethylene valeramide which melts at 178° C./0.8 mm. The hydrochloride, recrystallized from ethyl acetate, melts at 150° C.

*Analysis.*—$C_{18}H_{25}N_3O.HCl$. Calculated, percent: C=64.30, H=7.74, N=12.50, Cl=10.57. Found, percent: C=63.92, H=7.87, N=12.21, Cl=10.25.

FIFTH SERIES OF EXAMPLES

There is first prepared N-diethyl phenyl cyanacetamide, which corresponds to the formula:

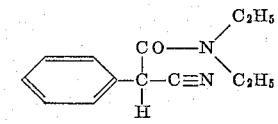

62 g. of diethylamine are slowly added, with good cooling and stirring, to 80 g. of ethyl phenyl cyanacetate. When the mixture has returned to normal temperature, it is introduced into an autoclave and heated for 6 hours to 150° C. After cooling, the mass is taken up in 500 cc. of 2.5 N hydrochloric acid and the insoluble substance is extracted with benzene, the benzene solution is washed with water, dried over anhydrous magnesium sulfate and the solvent is driven off in vacuo. The oily residue crystallizes on adding petroleum ether. 74 g. of a product are obtained, which is purified by recrystallization from a mixture of ethyl acetate and petroleum ether. It melts at 56° C.

*Analysis.*—$C_{13}H_{16}N_2O$ (M.W.=216.27). Calculated, percent: C=72.19, H=7.46, N=12.95. Found, percent: C=72.20, H=7.66, N=13.12.

Example 19

N-diethyl-phenyl cyanacetamide is condensed with 2-diethyl-amino chloro ethane giving, in a yield of 75%, 2-phenyl-2-cyano-4-diethyl-amino-N-diethyl butyramide.

$$ANR_3R_4 = -CH_2-CH_2-N\begin{matrix}C_2H_5\\C_2H_5\end{matrix}$$

This product boils at 164–165° C./1.4 mm. The hydrochloride, recrystallized from ethyl acetate, melts at 144° C.

Analysis.—$C_{19}H_{29}N_3O \cdot HCl$ (M.W.=351.95). Calculated, percent: C=64.80, H=8.59, N=11.94, Cl=10.07. Found, percent: C=65.12, H=8.59, N=11.94, Cl=10.10.

Example 20

2-dimethylamino chloro ethane is condensed with N-diethyl-phenyl cyanacetamide giving, in a yield of 84%, 2-phenyl-2-cyano-4-dimethylamino-N-diethyl butyramide.

$$ANR_3R_4 = -CH_2-CH_2-N\begin{matrix}CH_3\\CH_3\end{matrix}$$

This product boils at 152° C./1.5 mm. The hydrochloride, recrystallized from ethyl acetate, melts at 179° C.

Analysis.—$C_{17}H_{25}N_3O \cdot HCl$ (M.W.=323.85). Calculated, percent: C=63.04, H=8.09, N=12.97, Cl=10.91. Found, percent: C=63.04, H=7.94, N=12.80, Cl=10.90.

Example 21

N-diethyl phenyl cyanacetamide is condensed with 2-piperidino chloro ethane giving, in a yield of 80%, 2-phenyl-2-cyano-4-piperidino-N-diethyl butyramide.

$$ANR_3R_4 = -CH_2-CH_2-N\langle piperidino\rangle$$

This product boils at 180–181° C./1 mm. The hydrochloride, recrystallized from methyl ethyl ketone, melts at 181° C.

Analysis.—$C_{20}H_{29}N_3O \cdot HCl$ (M.W.=636.90). Calculated, percent: C=66.00, H=8.30, N=11.52, Cl=9.74. Found, percent: C=66.03, H=8.34, N=11.37, Cl=9.74.

Example 22

N-diethyl phenyl cyanacetamide is condensed with 2-N-morpholino chloro ethane giving, with a yield of 65%, 2-phenyl-2-cyano-4-N-morpholino-N-diethylbutyramide.

$$ANR_3R_4 = -CH_2-CH_2-N\langle morpholino\rangle O$$

This product boils at 189–190° C./1 mm. The hydrochloride, recrystallized from methyl ethyl ketone, melts at 170° C.

Analysis.—$C_{19}H_{27}N_3O_2 \cdot HCl$ (M.W.=365.90). Calculated, percent: C=62.30, H=7.80, N=11.49, Cl=9.67. Found, percent: C=62.35, H=7.85, N=11.47, Cl=9.70.

Example 23

N-diethyl phenyl cyanacetamide is condensed with 3-dimethylamino-1-chloro propane giving, with a yield of 76.6%, 2-phenyl-2-cyano-5-dimethylamino-N-diethyl valeramide.

$$ANR_3R_4 = -CH_2-CH_2-CH_2-N\begin{matrix}CH_3\\CH_3\end{matrix}$$

This product boils at 170° C./0.6 mm. The hydrochoride, recrystallized from a mixture of ethyl acetate and acetone, melts at 156–158° C.

Analysis.—$C_{18}H_{27}N_3O \cdot HCl$ (M.W.=337.9). Calculated, percent: C=63.92, H=8.28, N=12.42, Cl=10.50. Found, percent: C=64.23, H=8.17, N=12.02, Cl=10.75.

Example 24

N-diethyl phenyl cyanacetamide is condensed with 1-chloro-2-dimethyl amino propane giving a basic product which boils at 145–147° C./0.7 mm.; its analysis corresponds to the empirical formula $C_{18}N_{27}N_3O$ (M.W.=301.42). Calculated, percent: C=71.72, H=9.03, N=13.94. Found, percent: C=71.83, H=9.28, N=13.76.

The product may be composed of one or both of the isomers:

$$ANR_3R_4 = -CH-CH_2-N\begin{matrix}CH_3\\CH_3\end{matrix}\ \text{or}\ -CH_2-CH-N\begin{matrix}CH_3\\CH_3\end{matrix}$$
$$\quad\ \ \ \ \ \ \ \ \ CH_3 \qquad\qquad\qquad\qquad\ \ \ CH_3$$

SIXTH SERIES OF EXAMPLES

There is first prepared N-dimethyl phenyl cyanacetamide, which corresponds to the formula:

$$\text{Ph}-\underset{H}{\overset{CO-N(CH_3)_2}{C}}-C\equiv N$$

100 cc. of a 33% benzene solution of dimethylamine are stirred and cooled externally. 70 g. of ethyl phenyl cyanacetate are added dropwise thereto. When the mixture has returned to normal temperature, it is transferred to an autoclave and heated for 6 hours at 150–180° C. After cooling, the mixture is taken up in 250 cc. of 2.5 N hydrochloric acid. The organic solvent phase is separated by decantation, washed with water and dried over anhydrous magnesium sulfate. The solvent is driven off in vacuo and the residue is recrystallized from a mixture of ether and petroleum ether. A yield of 60% is obtained of a product which melts at 67° C.

Analysis.—$C_{11}H_{12}N_2O$ (M.W.=188.22). Calculated, percent: =70.18, H=6.43, N=14.88. Found, percent: C=70.20, H=6.35, N=15.19.

Example 25

N-dimethyl phenyl cyanacetamide is condensed with diethylamino chloro ethane giving, in a yield of 62%, 2-phenyl-2-cyano-4-diethylamino-N-dimethyl butyramide.

$$ANR_3R_4 = -CH_2-CH_2-N\begin{matrix}C_2H_5\\C_2H_5\end{matrix}$$

This product boils at 159–160° C./1.3 mm.

Analysis.—$C_{17}H_{25}N_3O$ (M.W.=287.39). Calculated, percent: C=71.04, H=8.77, N=14.62. Found, percent: C=71.01, H=8.77, N=14.57.

Example 26

N-dimethyl phenyl cyanacetamide is condensed with 2-dimethylamino chloro ethane giving, in a yield of 69%, 2 - phenyl - 2-cyano-4-dimethylamino-N-dimethyl butyramide.

$$ANR_3R_4 = -CH_2-CH_2-N\begin{matrix}CH_3\\CH_3\end{matrix}$$

This product boils at 156–157° C./1.8 mm. The hydrochloride melts at 208° C.

Analysis.—$C_{15}H_{21}N_3O \cdot HCl$ (M.W.=295.80). Calculated, percent: C=60.90, H=7.50, N=14.20, Cl=11.99. Found, percent: C=61.05, H=7.31, N=14.12, Cl=12.03.

Example 27

2-piperidino chloro ethane is condensed with N-dimethyl phenyl cyanacetamide giving, in a yield of 80%, 2-phenyl-2-cyano-4-piperidino-N-dimethyl butyramide.

$$ANR_3R_3 = -CH_2-CH_2-N\langle piperidino\rangle$$

This product melts at 91° C.

*Analysis.*—$C_{18}H_{25}N_3O$. Calculated, percent: $C=72.20$, $H=8.42$, $N=14.04$. Found, percent: $C=72.00$, $H=8.45$, $N=14.10$.

Example 28

N-dimethyl phenyl cyanacetamide is condensed with 2-N-morpholino chloro ethane giving, in a yield of 45%, 2-phenyl-2-cyano - 4 - N-morpholino-N-dimethyl butyramide.

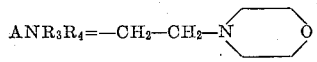

This product boils at 190–195° C./1 mm. and forms an oxalate which, recrystallized from alcohol, melts at 186° C.

*Analysis.*—$C_{17}H_{23}N_3O_2 \cdot C_2O_4H_2$ (M.W.=391). Calculated, percent: $C=58.30$, $H=6.44$, $N=10.74$. Found, percent: $C=58.51$, $H=6.45$, $N=10.60$.

The hydrochloride melts at 150° C.

Example 29

N-dimethyl phenyl cyanacetamide is condensed with 3-dimethylamino-1-chloro propane giving 2-phenyl-2-cyano-5-dimethylamino-N-dimethyl valeramide.

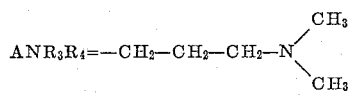

This product boils at 167–168° C./0.45 mm.; its hydrochloride melts at 168° C.

*Analysis.*—$C_{16}H_{23}N_3O \cdot HCl$ (M.W.=309.87). Calculated, percent: $C=61.97$, $H=7.74$, $N=13.55$, $Cl=11.45$. Found, percent: $C=61.84$, $H=7.47$, $=13.37$, $Cl=11.40$.

Example 30

N-dimethyl phenyl cyanacetamide is condensed with 2-dimethylamino-1-chloro propane giving a base which boils at 154–156° C./1.8 mm.; its analysis is in conformity with the empirical formula $C_{16}H_{23}N_3O$ (M.W.=273.37).

Calculated, percent: $C=70.29$, $H=8.48$, $N=15.37$. Found, percent: $C=70.18$, $H=8.72$, $N=15.59$.

This product may be composed of one or both of the isomers:

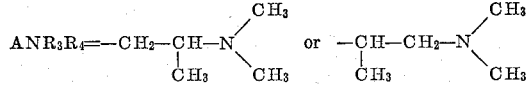

SEVENTH SERIES OF EXAMPLES

There is first prepared N-pentamethylene cyclohexyl cyanacetamide corresponding to the formula:

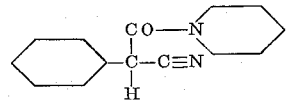

A mixture of 39 g. of ethyl cyclohexyl cyanacetate and 25.5 g. of piperidine is heated for 7 hours under reflux while stirring. After cooling, the reaction mixture is taken up in 250 cc. of 3 N hydrochloric acid, the solid substance is centrifuged, dried and recrystallized from cyclohexane. 30.5 g. of a product are obtained, which melts at 100° C.

*Analysis.*—$C_{14}H_{22}N_2O$ (M.W.=234.33). Calculated, percent: $C=71.75$, $H=9.46$, $N=11.96$. Found, percent: $C=72.18$, $H=9.77$, $N=11.83$.

Example 31

2-cyclohexyl - 2 - cyano - 4 - diethylamino-N-pentamethylene butyramide.

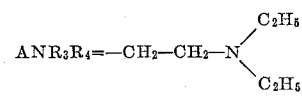

is prepared by the action of 2-diethylamino chloro ethane on N-pentamethylene cyclohexyl cyanacetamide. The product is an oil which boils at 182–190° C./1.5 mm.

*Analysis.*—$C_{20}H_{35}N_3O$ (M.W.=333.5). Calculated, percent: $C=72.02$, $H=10.58$, $N=12.60$. Found, percent: $C=71.93$, $H=10.30$, $N=12.49$.

Example 32

2-cyclohexyl - 2 - cyano- 4 - dimethylamino-N-pentamethylene butyramide.

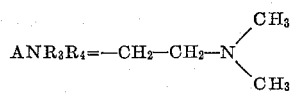

is obtained by the action of 2-dimethylamino chloro ethane on N-pentamethylene cyclohexyl cyanacetamide. The product is an oil which boils at 170–172° C./0.6 mm. Its hydrochloric melts at 226–228° C.

*Analysis.*—$C_{18}H_{31}N_3O \cdot HCl$. Calculated, percent: $C=63.17$, $H=9.35$, $N=12.28$, $Cl=10.38$. Found, percent: $C=63.21$, $H=9.02$, $N=12.22$, $Cl=10.32$.

Example 33

2-cyclohexyl - 2 - cyano - 4 - piperidino-N-pentamethylene butyramide.

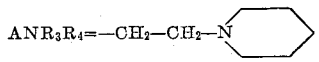

is obatined by the action of 2-piperidino chloro ethane on N-pentamethylene cyclohexyl cyanacetamide. The product is an oil which boils at 224–226° C./2 mm. Its hydrochloride melts at 220–222° C.

*Analysis.*—$C_{21}H_{35}N_3O \cdot HCl$ (M.W.=382.0). Calculated, percent: $C=65.96$, $H=9.42$, $N=10.99$, $Cl=9.29$. Found, percent: $C=65.58$, $H=9.39$, $N=10.92$, $Cl=9.40$.

Example 34

2-cyclohexyl - 2 - cyano - 4 - N - morpholino-N-pentamethylene butyramide:

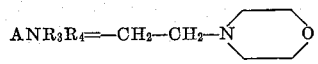

11.7 g. of N-pentamethylene cyclohexyl cyanoacetamide are added to a solution of sodium t-butylate, prepared from 1.15 g. of sodium and 120 cc. of tertiary butyl alcohol. 7.45 g. of 2-N-morpholino chloro ethane are added and the mixture is heated for 5 hours under reflux. After cooling, the mass is poured into 500 cc. of iced water, and the oil formed is extracted with ether. The ethereal solution is extracted with 2.5 N HCl, the acid solution is made alkaline by adding sodium hydroxide thereto, and the base is extracted with ether. After removing the solvent, the oil is distilled under a good vacuum. 11.2 g. of an oil are obtained, B.P. 226–228° C./2 mm. The hydrochloride melts at 212–215° C.

*Analysis.*—$C_{20}H_{33}N_3O_2 \cdot HCl$ (M.W.=384.0). Calculated, percent: $C=62.50$, $H=8.85$, $N=10.93$, $Cl=9.24$. Found, percent: $C=62.79$, $H=8.76$, $N=11.04$, $Cl=9.26$.

Example 35

2-cyclohexyl-2-cyano - 5 - dimethylamino - N - pentamethylene valeramide:

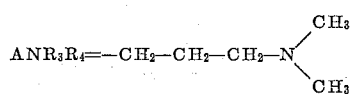

This base is prepared by the action of 3-dimethylamino-1-chloropropane on N-pentamethylene cyclohexyl cyanacetamide. The product boils at 186–188° C./0.9 mm. and its oxalate melts at 171° C.

*Analysis.*—$C_{19}H_{33}N_3O \cdot C_2O_4H_2$ (M.W.=409.51). Calculated, percent: $C=61.59$, $H=8.62$, $N=10.26$. Found, percent: $C=61.27$, $H=8.23$, $N=10.39$.

EIGHTH SERIES OF EXAMPLES

There is first prepared N-pentamethylene benzyl cyanacetamide corresponding to the formula:

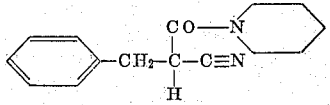

A mixture of 20.3 g. of ethyl benzyl cyanacetate and 8.5 g. of piperidine is heated for 8 hours in an oil bath kept at 150° C., the technique followed being that previously described. After cooling, the mass is taken up in 250 cc. of 4 N HCl. The insoluble substance is extracted with diethyl ether, the ethereal solution is washed with water and dried over magnesium sulfate, and the solvent is driven off. The residue is recrystallized from diisopropyl ether. The product melts at 60° C.

*Analysis.*—$C_{15}H_{18}N_2O$. Calculated, percent: $C=74.35$, $H=7.49$, $N=11.56$. Found, percent: $C=74.51$, $H=7.39$, $N=11.43$.

Example 36

2-benzyl-2-cyano-4-diethylamino-N-pentamethylene butyramide:

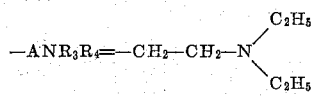

This product is prepared by the action of 13.5 g. of diethylamino chloro ethane on 24.2 g. of N-pentamethylene benzyl cyanacetamide in the presence of sodium t-butylate (prepared from 2.3 g. sodium and 300 cc. t-butyl alcohol). An oil is obtained which boils at 175° C./0.8 mm.

*Analysis.*—$C_{21}H_{31}N_3O$. Calculated, percent: $C=73.86$, $H=9.15$, $N=12.31$. Found, percent: $C=73.89$, $H=9.25$, $N=12.10$.

The therapeutic value of the compounds of Formula I has been confirmed as the result of extensive pharmacodynamic investigations.

The toxicity of the compounds was first investigated and the $LD_{50}$ on the mouse was determined using intravenous administration for the soluble products and intraperitoneal administration for the insoluble products. The compounds were tested in the form of a 5% suspension in gum arabic. The $LD_{50}$ values in mg./kg. for the compounds of Examples 1 to 30 were thus established.

| Compound of Example No. | Toxicity $LD_{50}$ (mg./kg.) |
|---|---|
| 1 | 40 |
| 2 | 40 |
| 3 | 45 |
| 4 | 90 |
| 5 | 45 |
| 6 | 58 |
| 7 | 35 |
| 8 | 130 |
| 9 | 180 |
| 10 | 76 |
| 11 | 160 |
| 12 | 118 |
| 13 | 97 |
| 14 | 60 |
| 15 | 80 |
| 16 | 51 |
| 17 | 85 |
| 19 | 35 |
| 20 | 60 |
| 21 | 40 |
| 22 | 80 |
| 23 | 50 |
| 24 | 30 |
| 25 | 50 |
| 26 | 80 |
| 27 | 40 |
| 28 | 250 |
| 29 | 70 |
| 30 | 70 |

The anti-tussive activity of the different compounds was then investigated.

(a) The first test used was the electrical stimulation test of the superior laryngeal nerve of a cat (Domerjoz technique).

A cat is anaesthetized by intraperitoneal injection of 25 mg./kg. of pentobarbital sodium and its superior laryngeal nerves are carefully dissected. Electrical excitation at the rate of 5 to 10 per second for 5 to 10 seconds is then effected with a stimulating device, the excitations (0.5 to 1 volt) being repeated for periods of at least two minutes. The movements of the abdominal region corresponding to respiration and to fits of coughing are recorded by means of a Marey device. The value of the administered antitussive substance is evaluated by observing the disappearance of these phenomena.

The following table gives the doses corresponding to the complete suppression of the fits of coughing thus caused:

| Compound of Example No. | Dose (mg./kg.) suppressing the fits of coughing |
|---|---|
| 1 | 2.5–5 |
| 2 | 5 |
| 3 | 10 |
| 4 | >10 |
| 5 | 5–10 |
| 6 | >10 |
| 7 | >5 |
| 8 | 10–20 |
| 9 | >20 |
| 10 | 10 |
| 11 | >20 |
| 12 | ≥20 |
| 13 | 20 |
| 14 | >10 |
| 15 | >10 |
| 16 | 10 |
| 17 | ≥10 |
| 19 | >2.5 |
| 20 | >10 |
| 21 | 5–10 |
| 22 | >10 |
| 23 | >10 |
| 24 | >5 |
| 25 | ≥5 |
| 26 | >10 |
| 27 | >10 |
| 28 | >25 |
| 29 | ≥20 |
| 30 | 10 |

(b) The second test used was the mechanical excitation test on the trachea of a guinea pig.

Guinea pigs are anaesthetized by intraperitoneal injection of 25 mg./kg. of pentobarbital sodium. A tracheotomy was then carried out and direct mechanical excitation of the tracheal epithelium was effected by means of a hair. The dose which prevents the occurrence of fits of coughing was determined with respect of the various compounds tested and the results are set forth in the following table:

| Compound of Example No. | Dose (mg./kg.) suppressing the occurrence of fits of coughing |
|---|---|
| 1 | ≥5 |
| 2 | >5 |
| 3 | 10 |
| 4 | ≥10 |
| 5 | ≥10 |
| 8 | >15 |
| 10 | ≥10 |

| Compound of Example No. | Dose (mg./kg.) suppressing the occurrence of fits of coughing |
|---|---|
| 11 | ≥20 |
| 12 | >30 |
| 13 | >20 |
| 16 | ≥10 |
| 17 | ≥10 |
| 21 | 10 |
| 27 | >10 |
| 29 | ≥15 |
| 30 | ≥15 |

The spasmolytic activity of the compounds was also studied.

Using isolated organs, namely the duodenum of the rat, placed in an oxygenated Tyrode solution of 37° C., a spasm was caused either by administering acetylcholine at a concentration of about $10^{-7}$ or of barium chloride at a concentration of $10^{-4}$. After washing the organs, an effort was made to prevent the occurrence of fresh spasms by adding the substances to be investigated. The following table gives the concentrations of the compounds which reduced by half the spasms caused by one or the other of the spasmogenic compounds.

| Compound of Example No. | Concentration of compound required | |
|---|---|---|
| | In the case of acetylcholine | In the case of barium chloride |
| 1 | $10^{-6}$ | $10^{-6}$ |
| 2 | $10^{-6}$ | |
| 3 | $6\times10^{-6}$ | $3\times10^{-6}$ |
| 4 | $10^{-5}$ | $10^{-5}$ |
| 5 | $6\times10^{-7}$ | $10^{-6}$ |
| 6 | $10^{-6}$ | $\geq10^{-5}$ |
| 8 | $3\times10^{-6}$ | $6\times10^{-7}$ |
| 9 | $2\times10^{-6}$ | $10^{-5}$ |
| 10 | $>10^{-5}$ | $\geq10^{-5}$ |
| 11 | $>6\times10^{-6}$ | $\geq10^{-5}$ |
| 12 | $10^{-6}$ | $>10^{-5}$ |
| 13 | $10^{-6}$ | $>10^{-5}$ |
| 14 | $6\times10^{-7}$ | $2\times10^{-6}$ |
| 15 | $3\times10^{-6}$ | $6\times10^{-6}$ |
| 19 | $3\times10^{-6}$ | $2\times10^{-5}$ |
| 20 | $10^{-6}$ | $10^{-5}$ |
| 21 | $6\times10^{-6}$ | $3\times10^{-6}$ |
| 22 | $10^{-5}$ | $10^{-5}$ |
| 23 | $6\times10^{-7}$ | $5\times10^{-6}$ |
| 24 | $3\times10^{-7}$ | $10^{-5}$ |
| 25 | $6\times10^{-7}$ | $6\times10^{-6}$ |
| 26 | $10^{-6}$ | $5\times10^{-6}$ |
| 27 | $5\times10^{-6}$ | $10^{-5}$ |
| 28 | $>10^{-5}$ | $>10^{-5}$ |
| 29 | $2\times10^{-6}$ | $10^{-5}$ |
| 30 | $3\times10^{-7}$ | $\geq10^{-5}$ |

The depressant effect on the central nervous system of the compounds was then investigated by examining the potentiation of narcosis caused by hexobarbital. 75 mg./kg. of hexobarbital were injected intraperitoneally into groups of 20 mice. One group was kept for control purposes and the mice of the other groups were injected, half an hour before the barbiturate, with the compound to be examined, also intraperitoneally.

The following table gives the doses which double the narcosis time.

| Compound of Example No. | Dose (mg./kg.) which doubles the narcosis time |
|---|---|
| 1 | >10 |
| 2 | >10 |
| 3 | 10 |
| 4 | 20 |
| 5 | 10 |
| 8 | 50 |
| 10 | >20 |
| 11 | >40 |
| 13 | >25 |
| 16 | 10 |
| 17 | 20 |
| 21 | 10 |
| 22 | >20 |
| 29 | >20 |
| 30 | >20 |

The respiration of a non-anaesthetized rabbit was then investigated. The respiration of the rabbit was recorded by means of a nasal probe connected to a Marey capsule and the rhythm and amplitude were examined before and after the compounds being investigated were administered intraperitoneally. It was found that the compounds of Examples 1, 2, 3, 5, 10, 11 and 17 are analeptic agents in doses of the order of 10 to 25 mg./kg.

Finally, the local anaesthetic activity of the compounds was investigated. The disappearance of the oculo-palpebral reflex initiated by touching the cornea of a rabbit was examined. The active substance was instilled in the eye of the rabbit and it was observed that the reflex only occurs after a certain number of stimulations or even that it disappears altogether. In this test the compounds of Examples 4, 10, 11, 12, 25, 28 and 29 possess interesting properties and, at relatively small concentrations, make it possible for the oculo-palpebral reflex to be completely suppressed.

I claim:

1. A compound of the formula

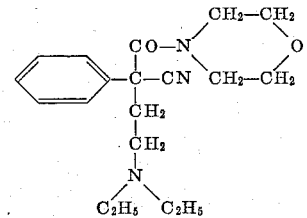

2. A compound of the formula

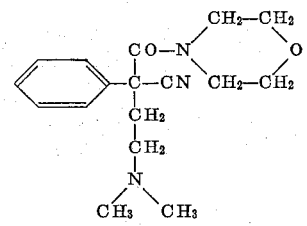

3. A compound of the formula

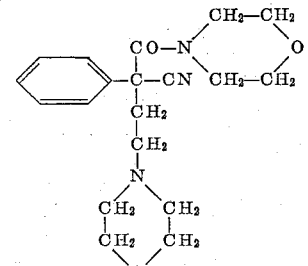

4. A compound of the formula

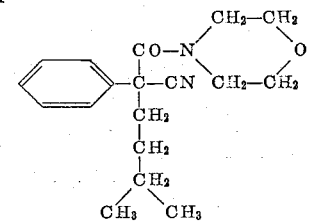

5. A compound of the formula

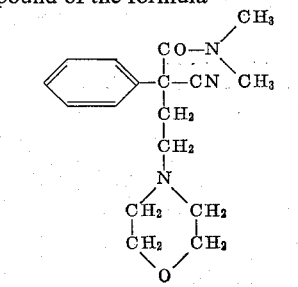

6. A cyano acetamide of the formula

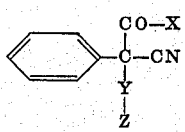

wherein

X is di-lower alkylamino,
Y is ethylene, and
Z is the morpholino ring.

7. The hydrochloride of a cyano acetamide of the formula

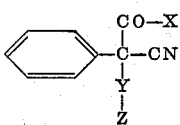

wherein

X is di-lower alkylamino,
Y is ethylene, and
Z is the morpholino ring.

8. A compound selected from the group consisting of a cyano acetamide of the formula

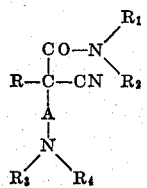

wherein

R is a member selected from the group consisting of phenyl, halogeno phenyl, phenyl lower alkyl, and cyclohexyl;

$R_1$ and $R_2$ are members selected from the group consisting of lower alkyl and $R_1$ and $R_2$, together with the nitrogen atom to which they are attached, form the piperidine, morpholine, and pyrrolidine ring;

$R_3$ and $R_4$ are members selected from the group consisting of lower alkyl and $R_3$ and $R_4$, together with the nitrogen atom to which they are attached, form the piperidine, morpholine, and pyrrolidine ring; and A is a member selected from the group consisting of alkylene having two and three carbon atoms and A, together with $R_3$ and the nitrogen atom to which $R_3$ and $R_4$ are attached, forms a member selected from the group consisting of the group of the formula

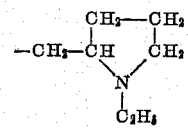

and the group of the formula

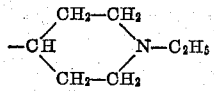

and their pharmaceutically acceptable acid addition salts.

9. A compound of the formula

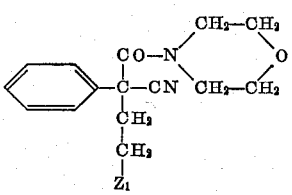

wherein $Z_1$ is di-lower alkylamino.

10. The hydrochloride of a cyano acetamide of the formula

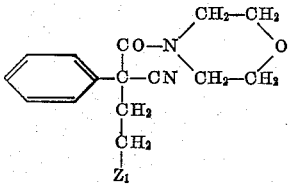

wherein $Z_1$ is di-lower alkylamino.

References Cited by the Examiner
UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 2,362,614 | 11/1944 | Calva | 167—22 |

ALEX MAZEL, *Primary Examiner.*

HENRY R. JILES, *Examiner.*

J. TOVAR, *Assistant Examiner.*